United States Patent [19]

Drevitch et al.

[11] Patent Number: 4,477,991
[45] Date of Patent: Oct. 23, 1984

[54] FRAME FOR TRANSPARENCY FILM

[75] Inventors: Nolan A. Drevitch, South Easton; Lawrence E. Green, Burlington, both of Mass.

[73] Assignee: Polaroid Corporation, Cambridge, Mass.

[21] Appl. No.: 334,087

[22] Filed: Dec. 24, 1981

[51] Int. Cl.³ .............................................. G09F 1/10
[52] U.S. Cl. .............................. 40/158 B; 40/158 R; 40/159; 40/152
[58] Field of Search ................ 40/158 B, 158 R, 159, 40/10 R, 152, 152.1

[56] References Cited

U.S. PATENT DOCUMENTS

| | | | |
|---|---|---|---|
| 2,338,189 | 1/1944 | Libby et al. | 40/159 |
| 2,477,470 | 7/1949 | Williams | 40/158 |
| 2,528,366 | 10/1950 | Houston | 40/159 |
| 2,587,109 | 2/1952 | Carroll | 40/159 |
| 3,341,960 | 9/1967 | Florjancic et al. | 40/152 |
| 3,470,642 | 10/1969 | Mundt et al. | 40/152 |
| 3,478,456 | 11/1969 | Mundt et al. | 40/152 |
| 3,530,608 | 9/1970 | Sovia | 40/159 |
| 3,808,722 | 5/1974 | Byers et al. | 40/152 |
| 4,110,924 | 9/1978 | Moderatho | 40/158 B |
| 4,199,883 | 4/1980 | Cross | 40/159 |
| 4,237,633 | 12/1980 | Murrell | 40/158 R |
| 4,250,641 | 2/1981 | Thompson | 40/158 B |

Primary Examiner—Gene Mancene
Assistant Examiner—Kris R. Schulze
Attorney, Agent, or Firm—Alfred E. Corrigan

[57] ABSTRACT

A unitary frame for mounting a film transparency having leading and trailing ends and spaced parallel sides which surround a picture area. The frame includes first and second members which are adapted for movement between a film transparency loading position and an operative position wherein they enclose and support the transparency. The frame includes, in the transparency loading position, a pair of laterally spaced open-ended guides for slidably receiving the parallel sides of the transparency as it is advanced into its proper relationship relative to the frame, and a pair of surfaces which extend forwardly of the open end of each of the guides and which function to direct the leading end of the transparency into the open end of each of the guides.

14 Claims, 11 Drawing Figures

U.S. Patent  Oct. 23, 1984  Sheet 2 of 4  4,477,991
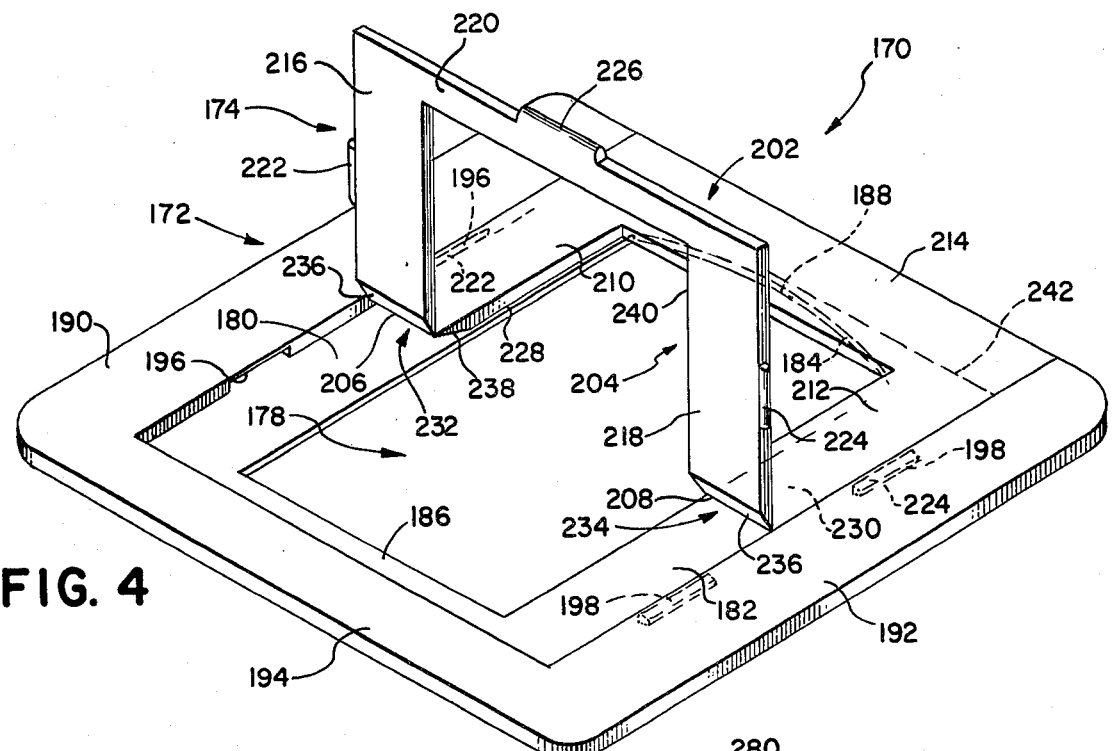
FIG. 4
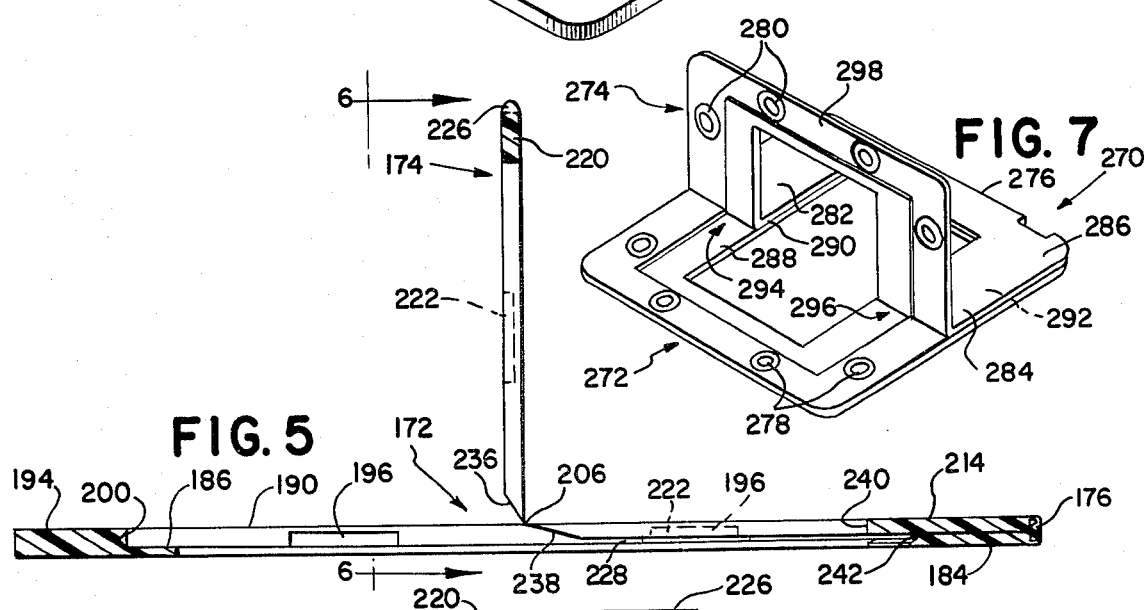
FIG. 5
FIG. 7
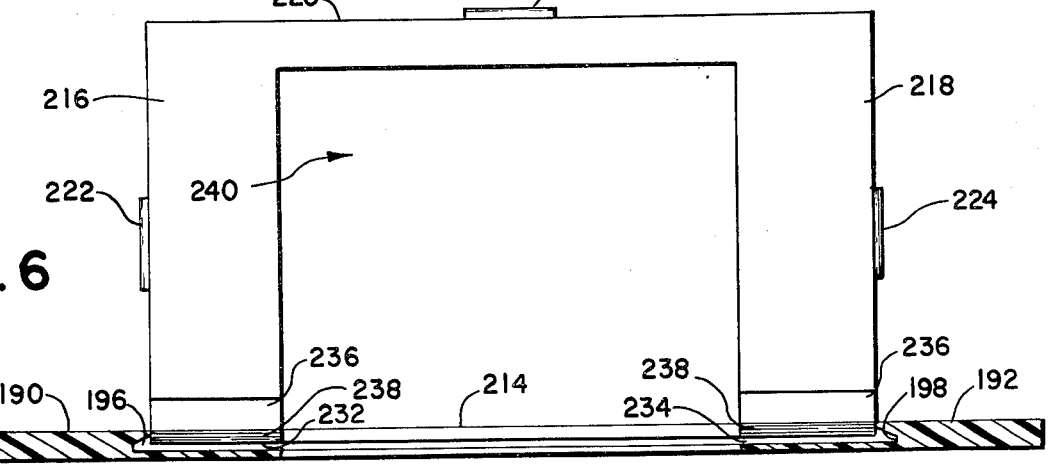
FIG. 6

FRAME FOR TRANSPARENCY FILM

RELATED APPLICATION

This application is related to application Ser. No. 334,088, entitled "Apparatus for Mounting Transparency Film", filed on even date herewith, by Lawrence E. Green et al, and now U.S. Pat. No. 4,427,486.

BACKGROUND OF THE INVENTION

1. Field of the Invention

This invention relates to a frame for a photographic film transparency.

2. Description of the Prior Art

This invention relates to a unitary frame for supporting a film transparency and, more particularly, to a frame which is adapted to slidably receive the film transparency in an end-wise manner, i.e., during mounting of the transparency, it is moved into an open end of a supporting structure of the frame. As is well known in the art, end-wise mounting of a transparency is fairly common, as evidenced by U.S. Pat. Nos. 4,250,641, 3,478,456, 3,470,642 and 3,341,960. However, the frames described and shown in these patents leave much to be desired. For example, while all of the disclosed frames have a pair of laterally spaced, longitudinally extending, guides having an open end for slidably receiving the leading end of a transparency, one must strive to insure that the leading end of the transparency "sees" or is in alignment with the opening defined, at least in part, by the open ends of the guides. In U.S. Pat. Nos. 3,470,642 and 3,341,960, external forces are applied to the open end of the frame so as to increase the chances that the leading end of the transparency can "see" the opening and therefore enter it. Otherwise, it appears that one would have to thread the leading end of the transparency into the open-ended guides. This end-wise loading seems even more tortuous when one considers the loading of a transparency into the frame disclosed in U.S. Pat. No. 3,478,456. In the latter patent, not only must one thread the leading end of the transparency into the open-ended guides but he must also use the transparency to deflect a portion of the frame to enable the transparency to be fully inserted into the frame.

The problem of the end of the transparency seeing the ends of the guides is partially recognized in U.S. Pat. No. 4,250,641. The frame disclosed in U.S. Pat. No. 4,250,641 is provided with a pair of sloping surfaces which function to funnel the leading end of the transparency into a pair of open-ended guides. However, this solution leaves something to be desired insofar as the leading end of the transparency must now "see" the opening in the end of the frame, which opening is partially defined by the aforementioned sloping surfaces and has a maximum depth, as measured in a plane perpendicular to opposite major faces of the frame, which is limited by the thickness of the frame.

SUMMARY OF THE INVENTION

The present invention relates to a unitary frame for receiving, in an end-wise manner, and supporting a transparency for subsequent use in a projector. The frame is preferably formed from a plastic material, e.g., styrene, and includes, in a preferred embodiment, first and second frame members which are integrally connected to each other by a hinge. The first frame member includes a recessed portion in which a film transparency is adapted to be located. The recessed portion includes an aperture and a surrounding border, which border includes a pair of spaced parallel sides having a maximum width therebetween substantially equal to the width of the transparency. A pair of flanges extend from opposite edges of the parallel sides toward each other and over a portion of the underlying parallel sides so as to define, with the parallel sides, a pair of open-ended guides for receiving the lateral sides of a transparency. Each of the flanges has a major dimension, the length of which is substantially less than the length of the adjacent or corresponding parallel border side, thus leaving a substantial length of each parallel border side uncovered, when the first and second frame members are in a transparency loading position.

When the first and second frame members are in the transparency loading position, the first frame member is positioned such that the uncovered lengths of the parallel border sides are located in the path of travel of a transparency. As the leading end of the advancing transparency moves into the recess, it engages the uncovered surfaces of the parallel border sides and is directed along the surfaces thereof into the open-end of each of the guides. As such, each uncovered length of parallel border side functions as a ramp to facilitate the introduction of the leading end of the transparency into the relative thin open-end of each guide. Movement of the transparency is continued until the leading end of the transparency bottoms out in the closed end of each of the guides. The trailing end of the transparency may then be severed from the remainder of the strip in a manner which allows the severed end of the transparency to automatically move down into the recessed portion of the first frame member. The second frame member may then be folded over the first frame member such that an aperture therein is located in substantial alignment with the aperture in the first frame member and with the picture area of the transparency. Suitable fastening elements associated with each of the frame members coact with each other to releasably retain the frame members in the folded or operative position.

The dimensions of the second frame member are preferably less than those of the first frame member such that, when the two are in the folded operative position, three of the four edges of the frame present substantially clean or uninterrupted surfaces to a frame changing mechanism of a projector thereby decreasing the chance that the frame will become hung up on the changing mechanism.

An object of the invention is to provide a unitary frame for a film transparency with means for facilitating the introduction of an end of a transparency into an open-ended guide.

Another object of the invention is to construct a unitary frame of the type described such that at least one and preferably three of its four peripheral edges present substantially uninterrupted surfaces to a frame changing apparatus.

Other objects of the invention will in part be obvious and will in part appear hereinafter.

The above-mentioned and other features and objects of the invention and the manner of attaining them will become more apparent and the invention itself will be best understood by reference to the following detailed description of the invention taken in connection with the accompanying drawings.

BRIEF DESCRIPTION OF THE DRAWINGS

FIG. 4 is an enlarged perspective view of an alternative embodiment of the instant invention;

FIG. 5 is a longitudinal, enlarged, cross-sectional view of the frame shown in FIG. 4;

FIG. 6 is an end view of the frame shown in FIG. 5, the view being taken generally along the line 6—6 of FIG. 5;

FIG. 7 is a perspective view of another embodiment of the instant invention;

DETAILED DESCRIPTION OF THE INVENTION

Figure 1:
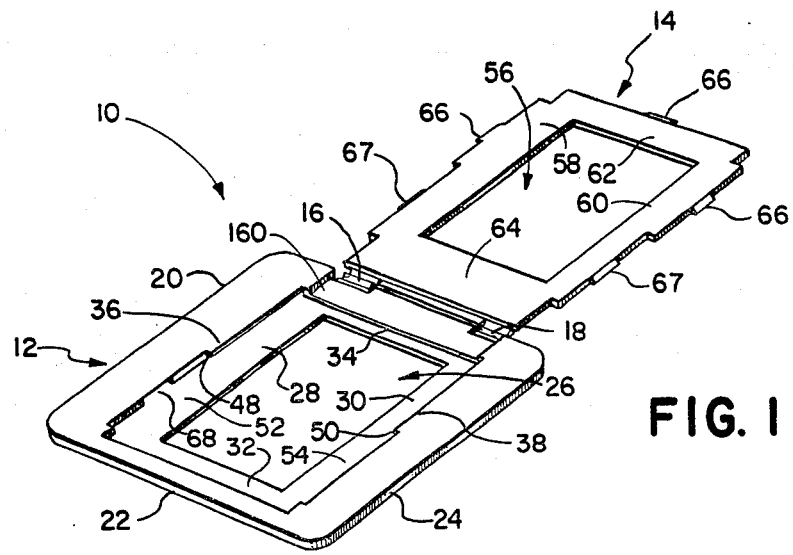
FIG. 1 is a perspective view of a preferred embodiment of a frame for a film transparency.
Figure 2:
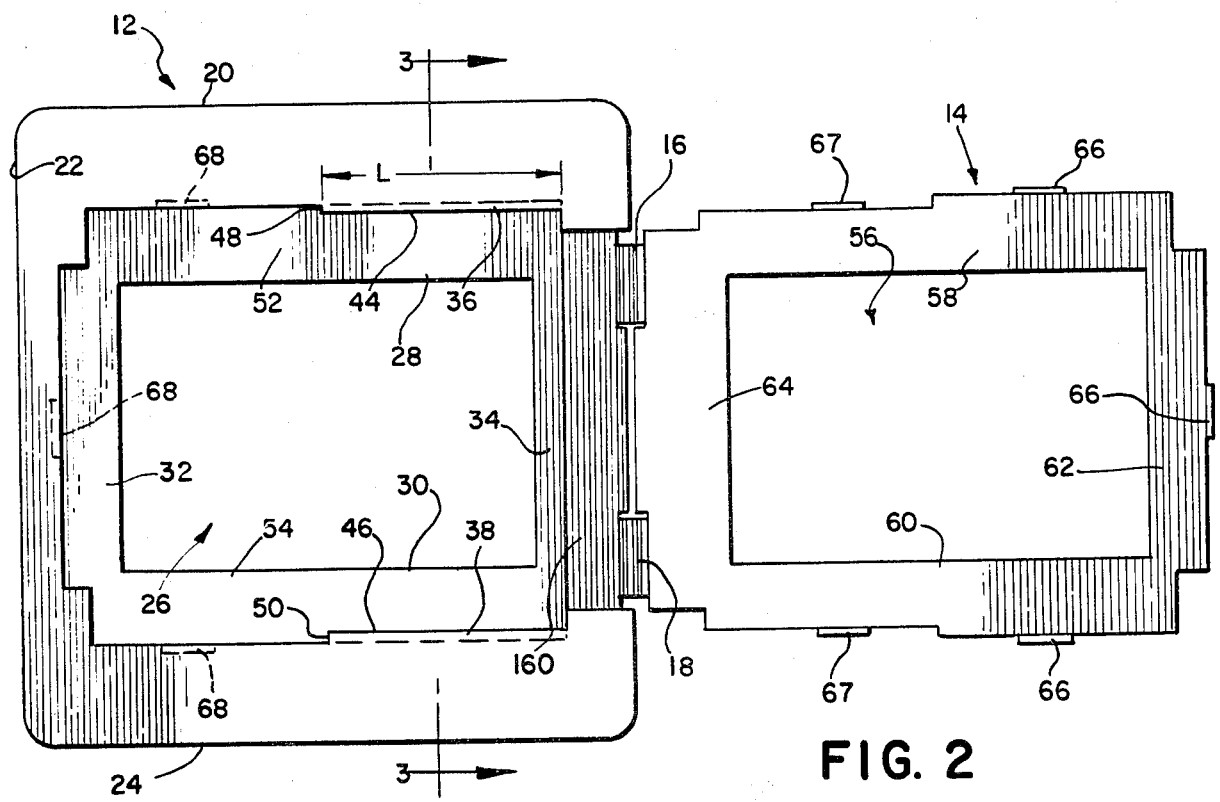
FIG. 2 is an enlarged plan view of the frame shown in FIG. 1.
Figure 3:
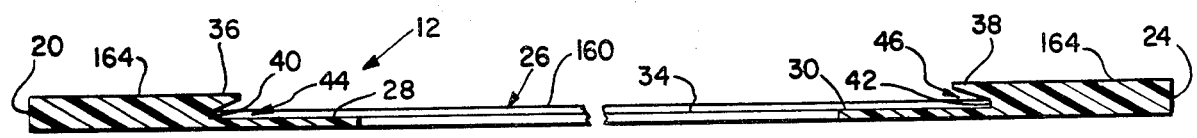
FIG. 3 is an enlarged cross-sectional view of the frame shown in FIG. 2, taken generally along the line 3—3 of FIG. 2.

Reference is now made to FIGS. 1–3 wherein is shown a preferred form of a unitary frame 10 which is adapted to support a photographic film transparency, e.g., of the common 35 mm size. The frame 10 is preferably molded from a plastic material, e.g., styrene, and is comprised of first and second frame sections 12 and 14, respectively, which are integrally connected to each other by a hinge consisting of hinge sections 16 and 18. The hinge sections 16 and 18 enable the first and second frame sections 12 and 14 to be moved from a transparency loading position, as shown in FIGS. 1 and 2 wherein the frame sections 12 and 14 are located end-to-end, to an operative transparency supporting position wherein the second frame section 14 has been rotated into superposition with the first frame section 12 and, preferably, lies within a plane containing the first frame section. So positioned, the frame 10 has a periphery defined in part by the hinge, and by edges 20, 22 and 24 which present substantially uninterrupted surfaces to a transparency frame changing apparatus.

Figure 8:
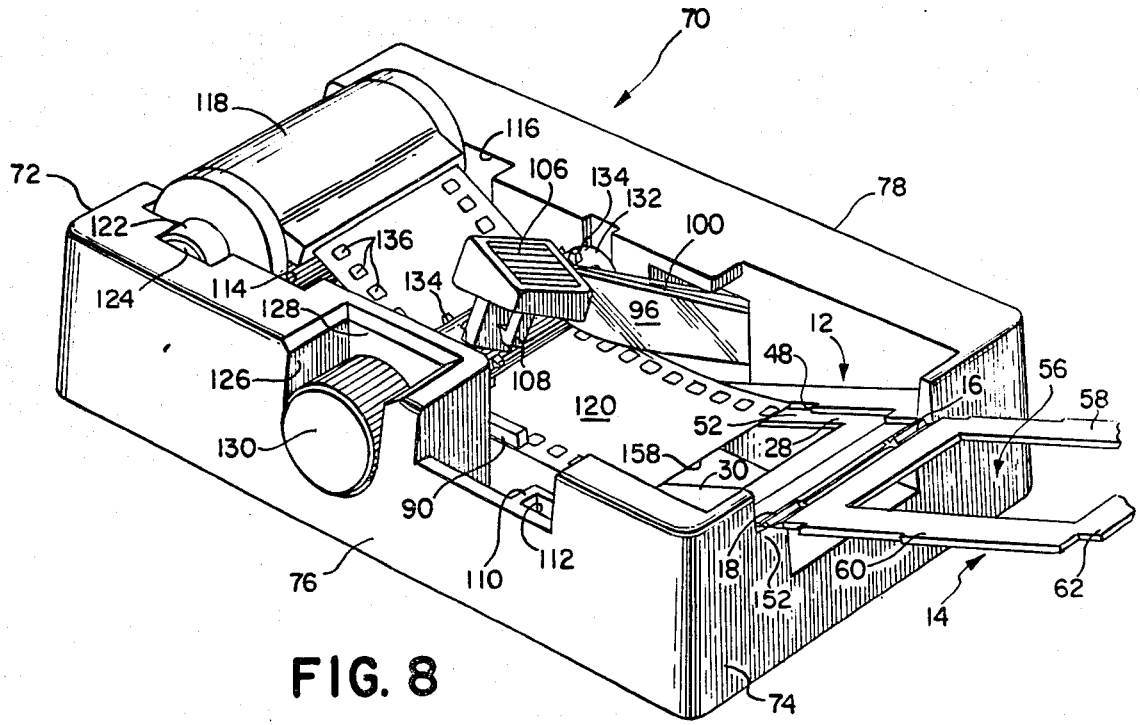
FIG. 8 is a perspective view of an apparatus which is adapted to mount a transparency in a frame of the type shown in FIGS. 1–7.
Figure 10:
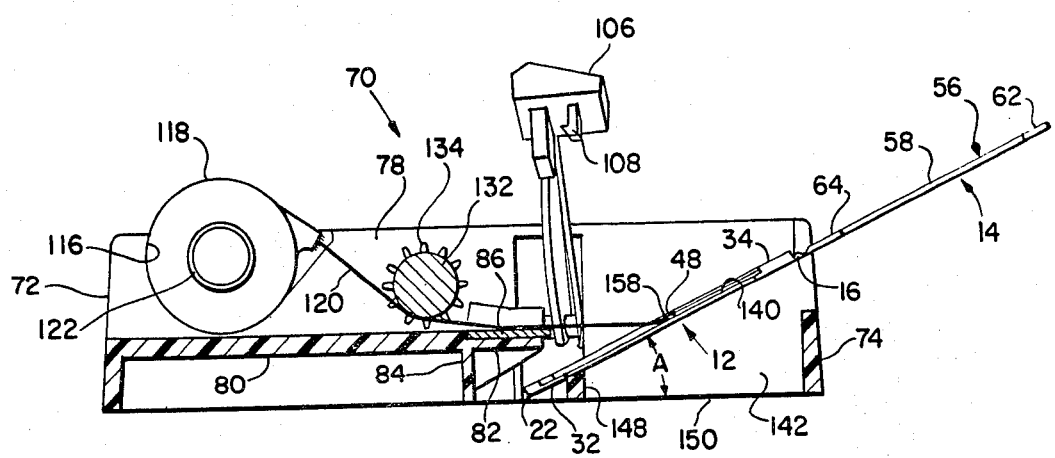
FIG. 10 is a longitudinal cross-sectional view of the apparatus shown in FIGS. 8 and 9.
Figure 11:
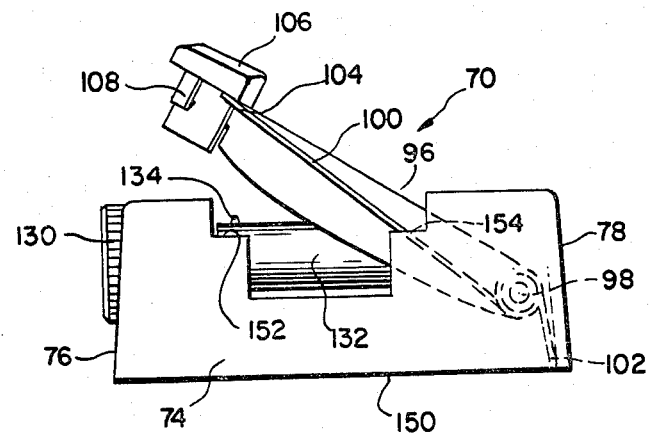
FIG. 11 is an end view of the apparatus shown in FIGS. 8–10.

The first frame member 12 has a generally rectangular configuration having a correspondingly shaped aperture 26 which is surrounded or bordered by a recessed portion including a pair of spaced parallel sides 28 and 30 the ends of which are interconnected by a pair of transversely extending sides 32 and 34. The parallel sides 28 and 30 of the border are adapted to support the parallel sides of a film transparency, as shown in FIGS. 8 and 10. The first frame member 12 also includes a pair of longitudinally extending flanges 36 and 38, each of which has a length L substantially less than that of the underlying side 28 and 30, respectively, and is preferably approximately equal to one-half the length of the underlying parallel side of the first frame member 12. The flanges 36 and 38 also extend from a line adjacent the outermost edges 40 and 42 of the parallel sides 28 and 30, respectively, toward each other and over portions of the underlying parallel sides 28 and 30 so as to define therewith a pair of guides 44 and 46 having open ends 48 and 50, respectively. The guides 44 and 46 have a maximum lateral spacing therebetween, as measured between the edges 40 and 42, which is substantially equal to the width of a transparency which is to be mounted within the frame 10. Thus, there are portions 52 and 54 of the parallel sides 28 and 30 which are not covered by the flanges 36 and 38 and which extend forwardly of the open ends 48 and 50 to a point where they merge with the transversely extending side 32 of the first frame member 12.

The second frame member 14 also has a generally rectangular configuration with a similarly configured aperture 56 centrally located therein. The aperture 56 is bordered or defined by a pair of spaced longitudinally extending sides 58 and 60 which are interconnected at their opposite ends by a pair of transversely extending ends 62 and 64. The periphery of the second frame member 14 is provided with a plurality of male connectors 66 which are adapted to be releasably received by correspondingly configured female connectors 68 in the first frame member 12 and a pair of projections 67 which are adapted to snap under the flanges 36 and 38 so as to maintain the two frame members in the operative transparency supporting position previously described. The second frame member 14 has length, width, and thickness dimensions which are less than the corresponding dimensions of the first frame member 12 and these values are selected such that the second frame member 14 preferably lies within a volume defined by the first frame member 12, when in the operative position.

Reference is now made to FIGS. 8–11 wherein is shown an apparatus 70 for use with the frame 10 and with the frames to be described hereinafter. The apparatus 70 is intended to withdraw a length of roll film from a film cassette, move it into operative relation to the frame 10, and then sever the length of film associated with the frame 10 from the remainder of the film so as to enable further manipulation of the frame to secure the severed film within the frame.

Figure 9:
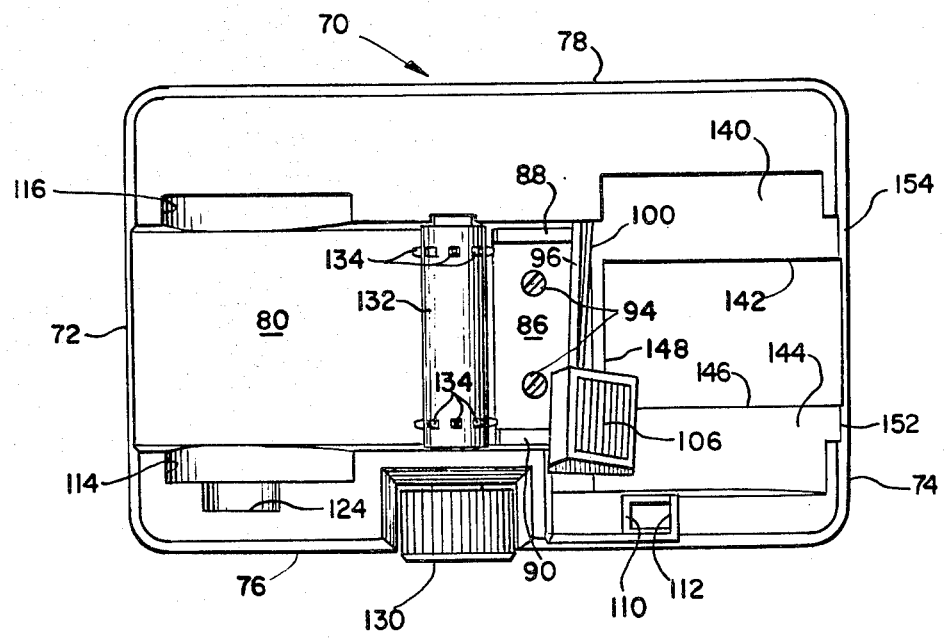
FIG. 9 is a plan view of the apparatus shown in FIG. 8.

The apparatus 70 generally takes the form of a truncated four-sided pyramid, preferably molded from a suitable plastic material. The apparatus 70 includes a pair of longitudinally spaced end walls 72 and 74 which are interconnected at their opposite ends by a pair of laterally spaced side walls 76 and 78. A generally horizontal platform 80 extends laterally from the side wall 76 to the side wall 78 and longitudinally from the end wall 72 to a transversely extending member having a generally horizontal flange 82 and a vertical flange 84. An anvil 86 is mounted between a pair of film depressors 88 and 90 and is secured to the horizontal flange 82 by a pair of screws 94. A blade 96 has one of its ends pivotally connected to the side wall 78 by a pin 98 and is resiliently biased into the position shown in FIGS. 8–11 and into engagement with an edge of the anvil 86 by a spring 100 which has one of its ends 102 coiled about the pin 98 and then secured against the side wall 78 and its other end 104 secured to a manually operative button 106 located on the free end of the blade 96. The button 106 includes a latch 108 which is adapted to engage the underside of a flange 110 which extends inwardly from the side wall 76 so as to secure the blade in the horizontal position when not in use. As best seen in FIG. 9, the button 106 and its integral latch 108 (not shown) are located to the left of the flange 110 and accordingly the button 106 is urged to the right against the bias of the spring 100 so as to permit the latch to enter an aperture 112, defined in part by the flange 110, and engage the underside of the flange 110.

The side walls 76 and 78 are provided with recesses 114 and 116 so as to receive the opposite ends of a conventional 35 mm film cassette 118. The cassette 118 preferably contains a length of instant type transparency film 120 which has been previously photographically exposed, developed, and rewound onto a film spool, an end of which is shown at 122 located within an extension 124 of the recess 114.

The side wall 76 is provided with a recess 126, defined in part by a wall 128. The recess 126 is adapted to receive a cylindrically-shaped knob 130 which is fixedly attached to a journal (not shown) of a roller 132 for rotating the same. The journals of the roller 132 are rotatively supported within bearings (not shown) located in the wall 128 and in the side wall 78. Opposite ends of the roller 132 are provided with a row of cogs 134 which extend around the periphery of the roller 132 and which are adapted to enter apertures 136 in the film 120 so as to advance the latter to the right, as viewed in FIG. 8.

The right hand portion of the apparatus 70, as viewed in FIGS. 8-10, includes a frame loading section comprised of a pair of ramps, each of which extend from a point just to the right of a vertical plane containing the right edge of the anvil 86 to the end wall 74. One of the ramps includes a surface 140, which extends inwardly from the side wall 78, and a vertical wall 142, while the other ramp includes a surface 144 which extends inwardly from the side wall 76 and a vertical wall 146. The lower ends of each of the ramps are connected by a transverse reinforcing member 148. Each of the ramp surfaces 140 and 144 defines an angle A with the base 150 of the apparatus 70, which angle A is preferably between 20° and 30° and in the structure shown in FIG. 10 is 24°. In order to obtain the angle of 24°, the end wall 74 is recessed so as to provide a pair of shoulders 152 and 154 for supporting the hinge area of the frame 10.

In the operation of the apparatus 70, a frame 10 is positioned, as shown in FIGS. 8 and 10, such that the first frame member 12 is located on the ramp surfaces 140 and 144 with its peripheral edge 22 in engagement with a pair of stops 156 (only one being shown), which extend inwardly toward each from the side walls 76 and 78, and with its transversely extending side 32 being supported by the reinforcing member 148. This position of the frame members 12 and 14 is also referred to as the transparency loading position.

The operator then threads the end of the film 120 under the roller 132 while simultaneously rotating the knob 130 in a counterclockwise direction until the cogs 134 enter the apertures 136 in the sides of the film. Once engaged, the ends of the film cassette 118 may then be lowered into their respective recesses 114 and 116. Rotation of the knob 130 is again commenced in the counterclockwise direction until the film's leading edge 158 passes beneath the depressors 88 and 90 and then engages the portions 52 and 54 of the parallel sides 28 and 30 of the first frame member 12. Continued rotation of the roller 132 results in the leading edge 158 of the film 120 being deflected from a horizontal plane upwardly along the surfaces of the portions 52 and 54 with lateral movement of the film 120 being restricted by the edges 40 and 42 of the depressed area of the first frame member 12. Thus constrained and supported, the leading edge 158 of the film 120 may now be guided upwardly until it can readily "see" the open ends 48 and 50 of the guides 44 and 46, respectively, despite their restricted depth. Accordingly, the leading edge 158 easily enters the open ends 48 and 50 of the guides 40 and 42 and is advanced therealong until it bottoms out at the end of the guides at a raised transversely extending surface 160. After the film bottoms out in the guides 44 and 46, the blade 96 is pivoted downwardly (it having previously been released for automatic movement into the position shown in FIG. 8) thereby severing a length of film 120 containing an individual visible scene from the remainder of the film. Upon severing the film, the severed end automatically snaps downwardly into the recessed area of the first frame member 12 and, more particularly, it snaps or moves downwardly onto the transversely extending end 32. This snapping action is the result of the leading edge 158 of the film 120 being located in a different plane from that containing the trailing or severed edge. The second frame member 14 may now be grasped to remove the frame 10 with its associated severed section of film from the apparatus 70. Upon removal of the frame 10 from the apparatus 70, the operator pivots the second section 14 about the hinge sections 16 and 18 until it overlies the first frame section 12 and is located wholly within the recess thereof such that its exposed surface forms a continuation of the top surface 164 of the first frame member. In this position, known as the operative position, it functions to encompass or sandwich the severed position of film between it and the recessed area of the first frame portion 12. The second frame section 14 is releasably maintained in this position with its aperture 56 located in alignment with the aperture 26 by the connectors 66 and 68 and by the interaction between the connectors 67 and the flanges 36 and 38.

Reference is now made to FIGS. 4–6 wherein is shown an alternative embodiment of a frame, generally identified by reference character 170. The frame 170 which is also preferably formed from a plastic material, e.g., styrene, includes first and second frame members 172 and 174, respectively, which are integrally connected to each other by a hinge 176.

The first frame member 172 has a generally rectangular configuration having a correspondingly shaped aperture 178 which is surrounded or bordered by a recessed area which includes a pair of spaced parallel sides 180 and 182 the ends of which are interconnected by a pair of transversely extending sides 184 and 186. The parallel sides 180 and 182 of the recessed area are adapted to support the parallel sides of a film transparency. It will be noted that the edge of the aperture 178 adjacent to the side 184 is gently curved in the horizontal plane, as best shown at 188 in FIG. 4, so as to reduce the possibility of a leading edge of a transparency becoming hung up on this edge during the final movement of a transparency into the frame 170. The first frame member 172 also includes a generally U-shaped elevated section comprised of a pair of spaced parallel sides 190 and 192 which are connected at their left-hand ends by a transversely extending side 194. Each of the sides 190 and 192 is provided with a pair of recesses 196 and 198, respectively, while the transversely extending side 194 includes a recess 200.

The second frame member 174 includes first and second sections 202 and 204, respectively, which are integrally connected to each other by the hinges 206 and 208. The first section 202 includes a pair of spaced longitudinally extending sides 210 and 212 which are connected at one end thereof by a transversely extending side 214. The second section 204 includes a pair of longitudinally extending sides 216 and 218 which are connected at one end thereof by a transversely extending side 220. The opposite ends of the sides 216 and 218 are connected to sides 210 and 212, respectively, of the first portion 202 by the hinges 206 and 208. The outwardly facing edges of the sides 210, 212, 216 and 218 are provided with protuberances 222 and 224 which are adapted to be received by the recesses 196 and 198 in the first frame member 172 for releasably securing the first and second portions 202 and 204 in face-to-face relation with the first frame member 172. A protuberance 226 on the transversely extending side 220 is adapted to be received by the recess 200 for the same reason. The protuberances 222 and 224 have a thickness less than the corresponding dimension of the recesses 196 and 198. The first section 202 also has a natural tendency to rotate in a clockwise direction about the hinge 176 (as viewed in FIG. 5) back to its original position wherein it and the second section 204 have lain in end-to-end relation with the first frame member 172. Accordingly, each of the protuberances 222 and 224 rise into engagement with the roof of its respective recess 196 and 198 thereby defining a pair of longitudinally extending guides 228 and 230 having open ends 232 and 234, respectively, which are adapted to receive the leading edge 158 of an advancing strip of transparency film 120. Also, it will be noted that the hinges 206 and 208 are beveled at 236 and 238 so as to facilitate the introduction of the leading edge 158 of the film into the open ends 232 and 234.

The first and second sections 202 and 204 are integrally connected to each other for movement from the film transparency loading position, shown in FIG. 4, wherein the first section 202 overlies the spaced parallel sides 180 and 182 and is spaced therefrom so as to define the pair of open-ended guides 228 and 230, which guides have a maximum lateral spacing therebetween substantially equal to the given width of the film transparency and a length substantially less than the length of the spaced parallel sides 180 and 182, and the second section 204 extends from the open end 232, 234 of each of the guides 228 and 230 and defines an acute angle with the portions of said spaced parallel sides 180 and 182 which extend forwardly of the open ends of the guides, to an operative transparency supporting position, wherein the first and second sections 202 and 204 are in a plane which is generally parallel to a plane containing the spaced parallel sides 180 and 182 of the first frame member 172. The first and second sections 202 and 204 also define portions of an aperture 240 which is located in alignment with the aperture 178 in the first frame member 172 when the first and second frame members 172 and 174 are in the operative position. Further, the length of each of the open-ended guides 228 and 230 is equal to substantially one-half the length of each of the spaced parallel sides 180 and 182 of the first frame member 172.

A film transparency is adapted to be mounted within the frame 170 in a manner similar to the loading of the frame 10. Specifically, the frame 170, with its various parts arranged as shown in FIGS. 4-6, is positioned within the apparatus 70 with the first frame member 172 occupying the same relative position as the first frame member 12. Rotation of the knob 130 in a counterclockwise direction is effective to advance the leading edge 158 of the film 120 to the right, as viewed in FIG. 4, until it engages the portions of the spaced parallel sides 180 and 182 which extend forwardly of the open ends 236 and 238 of the longitudinally extending guides 228 and 230, respectively. Further advancement of the leading edge 158 results in it being deflected upwardly by the sides 180 and 182 while rearwardly the film is being held in a generally horizontal plane by the restrictors 88 and 90. As the leading edge 158 moves along the surfaces of the sides 180 and 182, it eventually enters the open ends 232 and 234 of the guides 228 and 230 and its advancement continued until it bottoms out or engages the end of each of the guides 228 and 230 at a slightly raised, transversely extending, vertical surface 242 which is generally perpendicular to the sides 190 and 192 of the first frame member 172 and is tangent to the curved surface 212. Next, the blade 96 is actuated to sever the partially mounted film frame from the remainder of the strip of film 120. As stated previously, this action results in the severed end of the partially mounted film automatically moving down into engagement with the transversely extending side 186 of the first frame member 172. The frame 170 is then removed from the apparatus 70 and the second section 204 of the second frame member 174 is rotated in a counterclockwise manner thereby moving it into the recessed area of the first frame member 172 where its sides 216, 218 and 220 cooperate with the underlying sides 180, 182 and 186 to fully enclose the sides of the film transparency and the upper surfaces of the second frame member 174 are located in the same plane as the upper surfaces of the first frame member 172.

Reference is now made to FIG. 7 wherein is shown a frame 270 which constitutes another embodiment of the instant invention. The frame 270 is similar to those described and includes first and second frame members 272 and 274 which are integrally connected by a hinge 276. Basically, the configuration of the first frame member 272 is the same as that of the first frame member 172 except the former has a plurality of male connectors 278 which are adapted to cooperate with a plurality of female connectors 280 located in the second frame member 274 for releasably securing the two frame members 272 and 274 in face-to-face relation. The second frame member 274 differs from the previously described second frame member 174 in that the longitudinally extending parallel sides 282 and 284 of the first portion 286 of the second frame member 274 not only extend over the recessed area 288 of the first frame member 272 to define longitudinally extending guides 290 and 292 having open ends 294 and 296, but the sides 282 and 284 also extend to the opposite edges of the first frame member 272. The frame 270 is adapted to be positioned within the apparatus 70 in the same manner as previously described with reference to the frame 170. After a transparency has been positioned within the frame 270, the second portion 298 is rotated into superposition with the underlying portions of the first frame member wherein it is releasably held in position by the connectors 278 and 280.

Since certain changes may be made in the above-described invention without departing from the scope thereof, it is intended that all matter contained in the above description or shown in the accompanying drawings shall be interpreted as illustrative and not in a limiting sense.

What is claimed is:

1. A unitary frame for mounting a film transparency having a given width defined by spaced parallel sides, a leading end, and a trailing end, said frame comprising:

first and second frame members integrally connected to each other for movement between a film transparency loading position and an operative position wherein said frame members are adapted to enclose and support a film transparency;

said first frame member includes means defining a recessed portion having a width substantially equal to the width of the transparency, an aperture, and a border surrounding said aperture, said border including spaced parallel sides having a maximum width therebetween substantially equal to the width of the film transparency, said parallel sides being adapted to support the parallel sides of the film transparency, said first frame member further includes a pair of longitudinally extending flanges having a length substantially less than that of said parallel sides of said border, said flanges further extend toward each other from opposite sides of said recessed portion and are spaced above said parallel sides of said border so as to define therewith a pair of open-ended guides having a maximum lateral spacing therebetween substantially equal to the given width of the film transparency, whereby during end-wise insertion of a film transparency, its leading end may engage portions of said parallel sides of said border which extend forwardly of said open-ended recesses and thereafter be directed along said parallel sides into the open end of each of said guides thereby locating the transparency in alignment with said aperture; and said second frame member includes a section having an aperture therein, said section being adapted to be received within said recessed portion of said first frame member, with said apertures located in alignment when said first and second frame members are in said operative position, thereby substantially enclosing the transparency.

2. A frame as defined in claim 1 wherein said first and second frame members are integrally connected to each other by a hinge which defines a portion of the periphery of said frame.

3. A frame as defined in claim 2 wherein said second frame member has maximum length and width dimensions which are less than the corresponding dimensions of said first frame member, whereby the periphery of said frame consists substantially of said hinge and the peripheral edges of said first frame member thereby presenting substantially uninterrupted edges on three sides of said frame to a frame changing apparatus.

4. A frame as defined in claim 3 wherein said first and second frame members include complementary interlocking members for releasably retaining said first and second members in said operative position.

5. A frame as defined in claim 3 wherein said flanges are substantially rigid.

6. A frame as defined in claim 1 wherein said second frame member is wholly located within said first frame member when said first and second frame members are in said operative position.

7. A frame as defined in claim 1 wherein each of said longitudinally extending flanges has a length substantially equal to one-half the length of each of said spaced parallel sides of said first frame member.

8. A unitary frame for mounting a film transparency having a given width defined by spaced parallel sides, a leading end, and a trailing end, said frame comprising:

first and second frame members integrally connected to each other for movement between a film transparency loading position and an operative position wherein said frame members are adapted to enclose and support a film transparency;

said first frame member includes means defining a recessed portion having a width substantially equal to the width of the transparency, an aperture, and a border surrounding said aperture, said border including spaced parallel sides which are adapted to support the parallel sides of the transparency; and said second frame member includes first and second sections integrally connected to each other by a hinge for movement from said film transparency loading position, wherein said first section is parallel with and overlies said spaced sides and is spaced therefrom so as to define a pair of open-ended guides having a maximum lateral spacing therebetween substantially equal to the given width of the film transparency and a length substantially less than the length of said spaced parallel sides, and said second section extends in an unstressed condition from the open end of each of said guides and defines an angle with said first section and with the portions of said spaced parallel sides which extend forwardly of the open ends of said guides, to said operative position, wherein said first and second sections are in a plane which is generally parallel to a plane containing said spaced parallel sides of said first frame member, said first and second sections also defining portions of an aperture which is located in alignment with said aperture in said first frame member when said first and second frame members are in said operative position.

9. A frame as defined in claim 8 wherein said first and second frame members are integrally connected to each other by a hinge which defines a portion of the periphery of said frame.

10. A frame as defined in claim 9 wherein said second frame member has maximum length and width dimensions which are less than the corresponding dimensions of said first frame member, whereby the periphery of said frame consists substantially of said hinge and the peripheral edges of said first frame member.

11. A frame as defined in claim 10 wherein said first and second frame members include complementary interlocking members for releasably retaining said first and second members in said operative position.

12. A frame as defined in claim 10 wherein said first and second frame members are substantially rigid.

13. A frame as defined in claim 8 wherein said second frame member is located wholly within said first frame member when said first and second frame members are in said operative position.

14. A frame as defined in claim 8 wherein the length of each of said open-ended guides is equal to substantially one-half the length of each of said spaced parallel sides of said first frame member.

* * * * *